United States Patent [19]

Verboom

[11] Patent Number: 5,126,991

[45] Date of Patent: Jun. 30, 1992

[54] TRACK ADDRESSING METHOD AND APPARATUS

[75] Inventor: Johannes J. Verboom, Black Forest, Colo.

[73] Assignee: North American Philips Corporation, New York, N.Y.

[21] Appl. No.: 545,859

[22] Filed: Jun. 29, 1990

[51] Int. Cl.⁵ .............................................. H04N 5/76
[52] U.S. Cl. ...................................... 369/59; 360/49
[58] Field of Search ............................ 369/59, 47–49; 360/49

[56] References Cited

U.S. PATENT DOCUMENTS

| | | | |
|---|---|---|---|
| 4,802,154 | 1/1989 | Verboom et al. | 369/59 |
| 4,930,115 | 5/1990 | Verboom et al. | 369/59 |

Primary Examiner—Vincent P. Canney
Attorney, Agent, or Firm—David R. Treacy

[57] ABSTRACT

Encoding and decoding of track address information stored on an optical disk is provided. The optical disk includes a number of tracks, each track being definable as having a plurality of position segments for storing track address information. Each of the position segments includes a single recording mark. The location of the recording mark in the position segment is indicative of the value of a digit that represents the encoded track address information. Preferably, the location of only one recording mark for a position segment changes between adjacent disk tracks. When decoding the track address information read from the optical disk, differential detection is utilized.

24 Claims, 6 Drawing Sheets

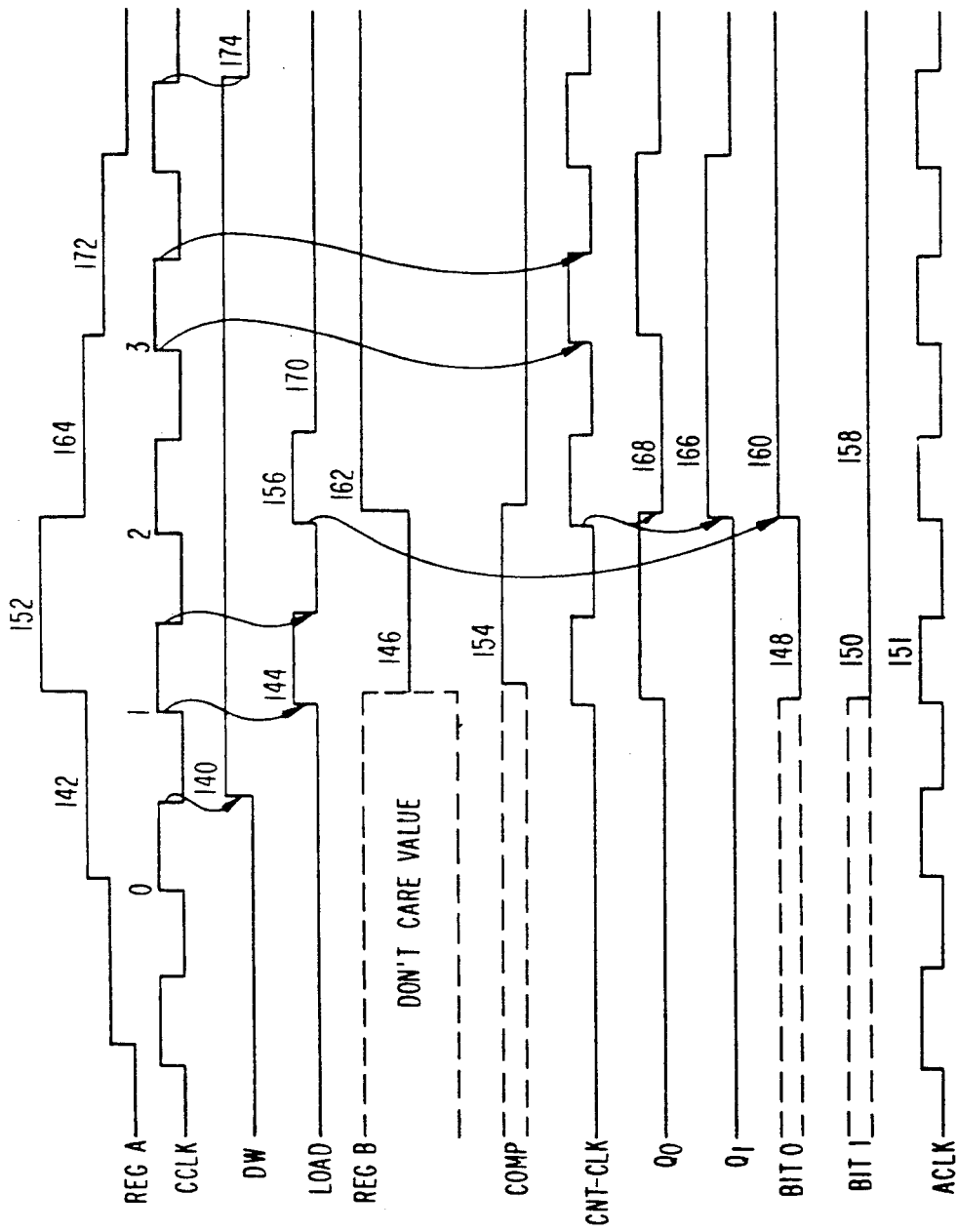

TRACK ADDRESSING METHOD AND APPARATUS

FIELD OF THE INVENTION

The present invention relates to track address information and, in particular, to method and apparatus for encoding track address information and decoding it using differential detection means.

BACKGROUND OF THE INVENTION

Information/data contained on a record carrier, such as on optical disk, is placed in concentric or spiral tracks surrounding the center of the disk. In order for the information to be written to or read from the disk, the disk write/read assembly moves from one track to another until the track is reached on which information is to be written/read. To accomplish this, each track should be identifiable. And, the write/read assembly should be able to identify tracks as it seeks the location of a track on or from which particular information is to be written or read.

In general, each track is given a unique address which is encoded and written in one or more servo areas on the track. One common coding method involves the conversion of track addresses into gray code words in which only one bit changes between successive words. Such an encoding scheme is less prone to read errors than standard binary code at high disk rotation speeds because a change in only one bit needs to be noted. Different versions of the gray (or creeping) code exist, all of which have the common characteristic that the code words for adjacent tracks differ by only one bit.

Prior to the current invention, however, the use of all such codes has had a common disadvantage. Each bit in the codeword must be recorded on the disk as either a recording mark (a burned hole or pit) or a space and each bit must separately be read as a pit or a space. Consequently, in order to determine whether a bit is a logic zero or a logic one, the read assembly must rely on "threshold detection" techniques, i.e., a comparison is made between the signal reflected from one of the bit positions on the disk and an amplitude reference level. If the reflected signal is greater than the reference level, then the determination is made that the bit is one logic value; if the reflected signal is less than the reference level, then the determination is made that the bit is the other logic value.

A disadvantage of threshold detection is that it assumes that the amplitudes of the reflected signals representing one logic value (such as logic 1) will all be substantially the same and that the amplitudes of the reflected signals representing the other logic value (such as logic 0) will all be substantially the same. However, as the read assembly travels across the tracks, its speed may be such that it will not be positioned exactly over the center of a track during an address read operation. If it is positioned, for example, at one edge of a track the amplitudes of the reflected signals may be less than if the read assembly is positioned closer to the center of the track. Therefore, the reflected signal from a logic 1 may not have sufficient amplitude to exceed the reference level and the bit may be read erroneously as a logic 0.

Furthermore, at high densities, adjacent pits may overlap and they may not be resolved as two distinct pits. Even where a space is used to separate two pits, the pits may encroach onto the space making the space unreadable. Various and complicated coding methods have been developed to overcome this problem (such as requiring that there be no single spaces). However, each bit must still be separately read when threshold detection is utilized thereby leading to the aforementioned drawbacks. If an excessive number of track seek errors are resulted, information access time will increase, information may not be read accurately, and the overall performance of the optical storage system will decrease.

U.S. Pat. No. 4,802,154 discloses a high density code for recording primary data on a record carrier such as an optical disk. In contrast to gray codes, the codes disclosed in the '154 patent use code words in which successive values can differ by more than one bit. Furthermore, each of the two codes disclosed use a fixed number of pits (or holes burned into the disk surface) and can be read using differential detection techniques.

The '154 patent notes several constraints imposed which have the affect of complicating the code as well as complicating the encoding, detection and decoding circuits. For example, the number of pits in even positions equals the number of pits in odd positions to provide a spectral null for synchronization purposes. In addition, there are either no empty positions between adjacent pits or there are two or more empty positions between adjacent pits. This latter constraint is designed to reduce errors which occur when pits which are to be separated by one empty position encroach onto the empty position and conceal it from detection.

Even though each code word contains the same number of pits, each must still be read and decoded as an entire binary word of a particular length. Thus, in one of the embodiments, each code word has four pits and eleven spaces. The detector must determine the location of all four pits out of the fifteen possible positions and then convert the code word into an 8-bit data word. Furthermore, read errors can occur because successive values may differ by more than one pit changing position. Thus, such a method is not well suited to track addressing which requires that the disk read mechanism accurately identify successive tracks as it scans cross them.

The U.S. Pat. No. 4,930,115 discloses a code which can be read with threshold detection and whose code words contain a variable number of pits. Both non-creeping and creeping codes are disclosed. As previously stated, with threshold detection the amplitude of the light reflected from a position is compared with a fixed reference value in order to determine whether the bit at that position is a logic 0 or a logic 1. Errors can occur with threshold detection if the amplitude of the reflection from a space (no pit) is insufficient to exceed the reference level. In such a case, the space would be read as a pit.

Consequently, a need has arisen for an apparatus and method of accurately identifying tracks on a record carrier, such as an optical disk, which does not rely upon threshold detection and/or complicated coding techniques in which the recorded patterns have varying numbers of pits or in which the recorded patterns of successive addresses vary by more than one pit changing position.

SUMMARY OF THE INVENTION

Accordingly, it is an objective of the present invention to provide a method and apparatus for providing track addresses on a record carrier where in differential detection techniques are utilized in reading and decoding such addresses.

It is a further objective of the present invention to provide encoded track address byte that result in no more than two binary bit position changes between adjacent tracks.

It is a further objective of the present invention to provide track addresses in which each decimal digit of the encoded track address byte is represented on the record carrier by a single recording mark stored in a selected one of several positions and that the recorded patterns representing successive track address bytes differ by only one recording mark changing position To achieve these and other objectives, the present invention enables track address information to be encoded into one-byte code words or encoded track address information having several segments. Each segment represents one decimal digit. The method of encoding has been devised so that only one decimal digit changes, and by a value of only one, between code words stored on adjacent tracks.

Furthermore, each area onto which a track address is to be written is defined by or divided into a number of position segments, which each segment of the code word can occupy. In this way, a single recording mark in one pit position of the position segment represents the value that a digit of the address code word has. Differential detection can then be used to determine the pit position of the recording mark in each position segment and the result is decoded into the track address byte.

The present invention further includes, in one embodiment, simplified logic circuitry for encoding and decoding track address information as well as for differential detection. In another embodiment, coding and decoding of track address information is accomplished using a look-up table that correlates encoded and decoded track address information.

Accordingly, the method and apparatus of the present invention provide the technical advantage of enabling track addresses encoded by means of a form of creeping code to be accurately read using differential detection techniques.

BRIEF DESCRIPTION OF THE DRAWINGS

For more complete understanding of the present invention, and the advantages thereof, reference is now made to the following description taken in conjunction with the accompanying drawings, in which:

FIG. 6 illustrates signal waveforms obtained from the differential detector circuit illustrated in FIG. 5.

DETAILED DESCRIPTION

The preferred embodiment of the present invention is best understood by referring to FIGS. 1-6, with like numerals being used for like and corresponding parts for the various drawing figures.

Figure 1:
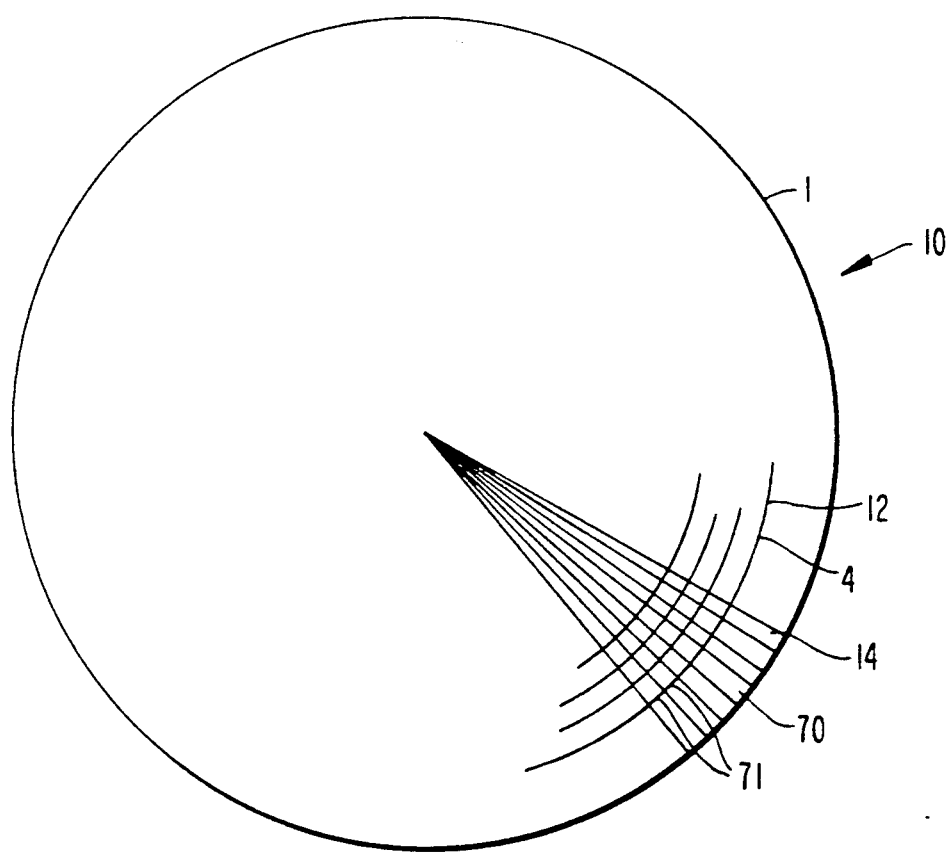
FIG. 1 illustrates a schematic representation of a record carrier with exemplary tracks and sectors shown.

FIG. 1 illustrates a record carrier 10, with the surface divided into concentric tracks 12 which are divided radially into sectors 14.

In the case in which the record carrier 10 is an optical disk, it comprises a disk surface of optically reflective material in which holes may be burned or formed to reduced the reflectivity of the surface of the disk at the hole. A light beam or laser is typically used to both record and read data on disk 10 as it is rotated by a motor. During a recording operation, the modulated outputted laser beam is provided at a power level sufficient to burn a hole or pit in the reflective material at selected locations. During a read operation, the laser operates continuously at a lower power level, which is insufficient to burn a hole in the surface, but the reflected, modulated light is used to obtain the information/data read from the disk 10. Specifically, a photodetector detects the reflection of the laser beam and converts the light into an electrical analog signal. The analog signal is then converted into digital values which can be decoded into useful information.

Means are employed for maintaining the position of the laser beam over a particular track 12 during read and write operations. In order to write information to or read information from a particular location on disk 10, means are also provided for identifying tracks 12 and sectors 14 and for directing the laser beam from one location on the surface to another. In that regard, each track has a unique identification so that the system can determine at all times the identity of the track on which the laser beam is focused as it scans across the tracks.

Existing techniques for providing each track with a unique address entail the conversion of the address from a decimal number into a code word or encoded track address information. Such encoding has traditionally been based upon a gray code in which successive addresses differ by only one bit thereby improving the readability of the information on the disk.

Each address code word, comprising a specific number of bits, is etched onto the disk surface at one or more locations on track 12 as pits and spaces. In order to read an address, the read assembly relies upon threshold detection in which each bit position is examined for a pit (a e.g., burned hole) or a space (in which the reflective nature of the disk surface is not affected). The reflected signal from each bit position is compared with a fixed reference level: if the amplitude of the reflected signal is greater than the reference level, then the bit at the particular position being read is a space; if the reflected signal is less than the reference level, then the bit at the particular position is a pit. Thus, pits and spaces can be treated as binary 1's and 0's. (In many systems, pits represent 1's and spaces represent 0's. Because a pit does not reflect light as well as a space, the analog signal from the reflection is inverted to enable a pit to be read as a higher amplitude than a space.)

Frequently, however, the laser beam is not directly over the center of the track as it scans the address information. The laser beam may be travelling across the disk as it seeks a particular track. Consequently, it may scan a track address while it is located near the edge of a track and the reflected signals, both from pits and from spaces, may have much lower amplitudes than if scanned while the laser beam is directly over the center of the track. The amplitude reduction may, in fact, be sufficient to prevent the inverted signal reflected from a pit from exceeding the reference level, thereby resulting in an address error.

The present invention substantially reduces such errors by utilizing a form of creeping code recorded on the record carrier in a pattern adapted to be read with differential detection techniques.

The following TABLE is a conversion table in which one-byte address code words of the preferred embodiment of the present invention are correlated with their decimal equivalents. Because there may be ten to twenty thousand tracks on each disk, a full address requires more than one byte. Thus, two code words from the TABLE can be combined to form a full two-byte address.

|  | J | K | L | M |
|---|---|---|---|---|
| 0 | 0 | 0 | 0 | 0 |
| 1 | 0 | 0 | 0 | 1 |
| 2 | 0 | 0 | 0 | 2 |
| 3 | 0 | 0 | 0 | 3 |
| 4 | 0 | 0 | 1 | 3 |
| 5 | 0 | 0 | 1 | 2 |
| 6 | 0 | 0 | 1 | 1 |
| 7 | 0 | 0 | 1 | 0 |
| 8 | 0 | 0 | 2 | 0 |
| 9 | 0 | 0 | 2 | 1 |
| 10 | 0 | 0 | 2 | 2 |
| 11 | 0 | 0 | 2 | 3 |
| 12 | 0 | 0 | 3 | 3 |
| 13 | 0 | 0 | 3 | 2 |
| 14 | 0 | 0 | 3 | 1 |
| 15 | 0 | 0 | 3 | 0 |
| 16 | 0 | 1 | 3 | 0 |
| 17 | 0 | 1 | 3 | 1 |
| 18 | 0 | 1 | 3 | 2 |
| 19 | 0 | 1 | 3 | 3 |
| 20 | 0 | 1 | 2 | 3 |
| 21 | 0 | 1 | 2 | 2 |
| 22 | 0 | 1 | 2 | 1 |
| 23 | 0 | 1 | 2 | 0 |
| 24 | 0 | 1 | 1 | 0 |
| 25 | 0 | 1 | 1 | 1 |
| 26 | 0 | 1 | 1 | 2 |
| 27 | 0 | 1 | 1 | 3 |
| 28 | 0 | 1 | 0 | 3 |
| 29 | 0 | 1 | 0 | 2 |
| 30 | 0 | 1 | 0 | 1 |
| 31 | 0 | 1 | 0 | 0 |
| 32 | 0 | 2 | 0 | 0 |
| 33 | 0 | 2 | 0 | 1 |
| 34 | 0 | 2 | 0 | 2 |
| 35 | 0 | 2 | 0 | 3 |
| 36 | 0 | 2 | 1 | 3 |
| 37 | 0 | 2 | 1 | 2 |
| 38 | 0 | 2 | 1 | 1 |
| 39 | 0 | 2 | 1 | 0 |
| 40 | 0 | 2 | 2 | 0 |
| 41 | 0 | 2 | 2 | 1 |
| 42 | 0 | 2 | 2 | 2 |
| 43 | 0 | 2 | 2 | 3 |
| 44 | 0 | 2 | 3 | 3 |
| 45 | 0 | 2 | 3 | 2 |
| 46 | 0 | 2 | 3 | 1 |
| 47 | 0 | 2 | 3 | 0 |
| 48 | 0 | 3 | 3 | 0 |
| 49 | 0 | 3 | 3 | 1 |
| 50 | 0 | 3 | 3 | 2 |
| 51 | 0 | 3 | 3 | 3 |
| 52 | 0 | 3 | 2 | 3 |
| 53 | 0 | 3 | 2 | 2 |
| 54 | 0 | 3 | 2 | 1 |
| 55 | 0 | 3 | 2 | 0 |
| 56 | 0 | 3 | 1 | 0 |
| 57 | 0 | 3 | 1 | 1 |
| 58 | 0 | 3 | 1 | 2 |
| 59 | 0 | 3 | 1 | 3 |
| 60 | 0 | 3 | 0 | 3 |
| 61 | 0 | 3 | 0 | 2 |
| 62 | 0 | 3 | 0 | 1 |
| 63 | 0 | 3 | 0 | 0 |
| 64 | 1 | 3 | 0 | 0 |
| 65 | 1 | 3 | 0 | 1 |

-continued

|  | J | K | L | M |
|---|---|---|---|---|
| 66 | 1 | 3 | 0 | 2 |
| 67 | 1 | 3 | 0 | 3 |
| 68 | 1 | 3 | 1 | 3 |
| 69 | 1 | 3 | 1 | 2 |
| 70 | 1 | 3 | 1 | 1 |
| 71 | 1 | 3 | 1 | 0 |
| 72 | 1 | 3 | 2 | 0 |
| 73 | 1 | 3 | 2 | 1 |
| 74 | 1 | 3 | 2 | 2 |
| 75 | 1 | 3 | 2 | 3 |
| 76 | 1 | 3 | 3 | 3 |
| 77 | 1 | 3 | 3 | 2 |
| 78 | 1 | 3 | 3 | 1 |
| 79 | 1 | 3 | 3 | 0 |
| 80 | 1 | 2 | 3 | 0 |
| 81 | 1 | 2 | 3 | 1 |
| 82 | 1 | 2 | 3 | 2 |
| 83 | 1 | 2 | 3 | 3 |
| 84 | 1 | 2 | 2 | 3 |
| 85 | 1 | 2 | 2 | 2 |
| 86 | 1 | 2 | 2 | 1 |
| 87 | 1 | 2 | 2 | 0 |
| 88 | 1 | 2 | 1 | 0 |
| 89 | 1 | 2 | 1 | 1 |
| 90 | 1 | 2 | 1 | 2 |
| 91 | 1 | 2 | 1 | 3 |
| 92 | 1 | 2 | 0 | 3 |
| 93 | 1 | 2 | 0 | 2 |
| 94 | 1 | 2 | 0 | 1 |
| 95 | 1 | 2 | 0 | 0 |
| 96 | 1 | 1 | 0 | 0 |
| 97 | 1 | 1 | 0 | 1 |
| 98 | 1 | 1 | 0 | 2 |
| 99 | 1 | 1 | 0 | 3 |
| 100 | 1 | 1 | 1 | 3 |
| 101 | 1 | 1 | 1 | 2 |
| 102 | 1 | 1 | 1 | 1 |
| 103 | 1 | 1 | 1 | 0 |
| 104 | 1 | 1 | 2 | 0 |
| 105 | 1 | 1 | 2 | 1 |
| 106 | 1 | 1 | 2 | 2 |
| 107 | 1 | 1 | 2 | 3 |
| 108 | 1 | 1 | 3 | 3 |
| 109 | 1 | 1 | 3 | 2 |
| 110 | 1 | 1 | 3 | 1 |
| 111 | 1 | 1 | 3 | 0 |
| 112 | 1 | 0 | 3 | 0 |
| 113 | 1 | 0 | 3 | 1 |
| 114 | 1 | 0 | 3 | 2 |
| 115 | 1 | 0 | 3 | 3 |
| 116 | 1 | 0 | 2 | 3 |
| 117 | 1 | 0 | 2 | 2 |
| 118 | 1 | 0 | 2 | 1 |
| 119 | 1 | 0 | 2 | 0 |
| 120 | 1 | 0 | 1 | 0 |
| 121 | 1 | 0 | 1 | 1 |
| 122 | 1 | 0 | 1 | 2 |
| 123 | 1 | 0 | 1 | 3 |
| 124 | 1 | 0 | 0 | 3 |
| 125 | 1 | 0 | 0 | 2 |
| 126 | 1 | 0 | 0 | 1 |
| 127 | 1 | 0 | 0 | 0 |
| 128 | 2 | 0 | 0 | 0 |
| 129 | 2 | 0 | 0 | 1 |
| 130 | 2 | 0 | 0 | 2 |
| 131 | 2 | 0 | 0 | 3 |
| 132 | 2 | 0 | 1 | 3 |
| 133 | 2 | 0 | 1 | 2 |
| 134 | 2 | 0 | 1 | 1 |
| 135 | 2 | 0 | 1 | 0 |
| 136 | 2 | 0 | 2 | 0 |
| 137 | 2 | 0 | 2 | 1 |
| 138 | 2 | 0 | 2 | 2 |
| 139 | 2 | 0 | 2 | 3 |
| 140 | 2 | 0 | 3 | 3 |
| 141 | 2 | 0 | 3 | 2 |
| 142 | 2 | 0 | 3 | 1 |
| 143 | 2 | 0 | 3 | 0 |
| 144 | 2 | 1 | 3 | 0 |
| 145 | 2 | 1 | 3 | 1 |
| 146 | 2 | 1 | 3 | 2 |

-continued

| | J | K | L | M |
|---|---|---|---|---|
| 147 | 2 | 1 | 3 | 3 |
| 148 | 2 | 1 | 3 | 3 |
| 149 | 2 | 1 | 2 | 2 |
| 150 | 2 | 1 | 2 | 1 |
| 151 | 2 | 1 | 2 | 0 |
| 152 | 2 | 1 | 1 | 0 |
| 153 | 2 | 1 | 1 | 1 |
| 154 | 2 | 1 | 1 | 2 |
| 155 | 2 | 1 | 1 | 3 |
| 156 | 2 | 1 | 0 | 3 |
| 157 | 2 | 1 | 0 | 2 |
| 158 | 2 | 1 | 0 | 1 |
| 159 | 2 | 1 | 0 | 0 |
| 160 | 2 | 2 | 0 | 0 |
| 161 | 2 | 2 | 0 | 1 |
| 162 | 2 | 2 | 0 | 2 |
| 163 | 2 | 2 | 0 | 3 |
| 164 | 2 | 2 | 1 | 3 |
| 165 | 2 | 2 | 1 | 2 |
| 166 | 2 | 2 | 1 | 1 |
| 167 | 2 | 2 | 1 | 0 |
| 168 | 2 | 2 | 2 | 0 |
| 169 | 2 | 2 | 2 | 1 |
| 170 | 2 | 2 | 2 | 2 |
| 171 | 2 | 2 | 2 | 3 |
| 172 | 2 | 2 | 3 | 3 |
| 173 | 2 | 2 | 3 | 2 |
| 174 | 2 | 2 | 3 | 1 |
| 175 | 2 | 2 | 3 | 0 |
| 176 | 2 | 3 | 3 | 0 |
| 177 | 2 | 3 | 3 | 1 |
| 178 | 2 | 3 | 3 | 2 |
| 179 | 2 | 3 | 3 | 3 |
| 180 | 2 | 3 | 2 | 3 |
| 181 | 2 | 3 | 2 | 2 |
| 182 | 2 | 3 | 2 | 1 |
| 183 | 2 | 3 | 2 | 0 |
| 184 | 2 | 3 | 1 | 0 |
| 185 | 2 | 3 | 1 | 1 |
| 186 | 2 | 3 | 1 | 2 |
| 187 | 2 | 3 | 1 | 3 |
| 188 | 2 | 3 | 0 | 3 |
| 189 | 2 | 3 | 0 | 2 |
| 190 | 2 | 3 | 0 | 1 |
| 191 | 2 | 3 | 0 | 0 |
| 192 | 3 | 3 | 0 | 0 |
| 193 | 3 | 3 | 0 | 1 |
| 194 | 3 | 3 | 0 | 2 |
| 195 | 3 | 3 | 0 | 3 |
| 196 | 3 | 3 | 1 | 3 |
| 197 | 3 | 3 | 1 | 2 |
| 198 | 3 | 3 | 1 | 1 |
| 199 | 3 | 3 | 1 | 0 |
| 200 | 3 | 3 | 2 | 0 |
| 201 | 3 | 3 | 2 | 1 |
| 202 | 3 | 3 | 2 | 2 |
| 203 | 3 | 3 | 2 | 3 |
| 204 | 3 | 3 | 3 | 3 |
| 205 | 3 | 3 | 3 | 2 |
| 206 | 3 | 3 | 3 | 1 |
| 207 | 3 | 3 | 3 | 0 |
| 208 | 3 | 2 | 3 | 0 |
| 209 | 3 | 2 | 3 | 1 |
| 210 | 3 | 2 | 3 | 2 |
| 211 | 3 | 2 | 3 | 3 |
| 212 | 3 | 2 | 2 | 3 |
| 213 | 3 | 2 | 2 | 2 |
| 214 | 3 | 2 | 2 | 1 |
| 215 | 3 | 2 | 2 | 0 |
| 216 | 3 | 2 | 1 | 0 |
| 217 | 3 | 2 | 1 | 1 |
| 218 | 3 | 2 | 1 | 2 |
| 219 | 3 | 2 | 1 | 3 |
| 220 | 3 | 2 | 0 | 3 |
| 221 | 3 | 2 | 0 | 2 |
| 222 | 3 | 2 | 0 | 1 |
| 223 | 3 | 2 | 0 | 0 |
| 224 | 3 | 1 | 0 | 0 |
| 225 | 3 | 1 | 0 | 1 |
| 226 | 3 | 1 | 0 | 2 |
| 227 | 3 | 1 | 0 | 3 |
| 228 | 3 | 1 | 1 | 3 |
| 229 | 3 | 1 | 1 | 2 |
| 230 | 3 | 1 | 1 | 1 |
| 231 | 3 | 1 | 1 | 0 |
| 232 | 3 | 1 | 2 | 0 |
| 233 | 3 | 1 | 2 | 1 |
| 234 | 3 | 1 | 2 | 2 |
| 235 | 3 | 1 | 2 | 3 |
| 236 | 3 | 1 | 3 | 3 |
| 237 | 3 | 1 | 3 | 2 |
| 238 | 3 | 1 | 3 | 1 |
| 239 | 3 | 1 | 3 | 0 |
| 240 | 3 | 0 | 3 | 0 |
| 241 | 3 | 0 | 3 | 1 |
| 242 | 3 | 0 | 3 | 2 |
| 243 | 3 | 0 | 3 | 3 |
| 244 | 3 | 0 | 2 | 3 |
| 245 | 3 | 0 | 2 | 2 |
| 246 | 3 | 0 | 2 | 1 |
| 247 | 3 | 0 | 2 | 0 |
| 248 | 3 | 0 | 1 | 0 |
| 249 | 3 | 0 | 1 | 1 |
| 250 | 3 | 0 | 1 | 2 |
| 251 | 3 | 0 | 1 | 3 |
| 252 | 3 | 0 | 0 | 3 |
| 253 | 3 | 0 | 0 | 2 |
| 254 | 3 | 0 | 0 | 1 |
| 255 | 3 | 0 | 0 | 0 |

As seen from the TABLE, each code word comprises four digits (labeled J, K, L and M), each digit being a number between zero and three, inclusive. It can been seen from the TABLE that the code words for successive addresses differ by exactly one digit changing by one. For example, the code word for track 15 is 0 0 3 0 while the code word for track 16 is 0 1 3 0, a difference of one in digit K. In the preferred embodiment, for the first 256 tracks, the least significant code word (one address byte) progresses as indicated in the TABLE while the most significant code word remains at 0 0 0 0. For the second 256 tracks, the most significant code word increments to 0 0 1 and the least significant code word repeats the progression of the TABLE. The most significant code word therefore, follows the progression of the TABLE but advances after each 256 tracks. Accordingly, only one digit within a code word changes between adjacent tracks.

In an alternative embodiment of the present invention, a full address is eight digits (16 bits) in length as in the preferred embodiment. However, to avoid more than one pit changing position (and by more than one position) every 256 tracks, the progression shown in the TABLE continues: track 255 is 0 0 0 0 3 0 0 0 while track 256 is 0 0 0 1 3 0 0 0, track 257 is 0 0 0 1 3 0 0 1 and so forth. The full address could be recorded as a single, eight-digit address or could be divided into two, four-digit address bytes. To generate and process the expanded, eight-digit code, the encoding, decoding and detector circuits would be expanded by adding appropriate stages to ensure that only one pit changes position and by only one position To generate and process the expanded code with separate address bytes, only slight modification would be required to the encoding, decoding and detector circuits of the preferred embodiment.

For purposes of the balance of this specification and the claims following, reference to a code word will refer to one four-digit address byte, two of which comprise a full address.

Figure 2:
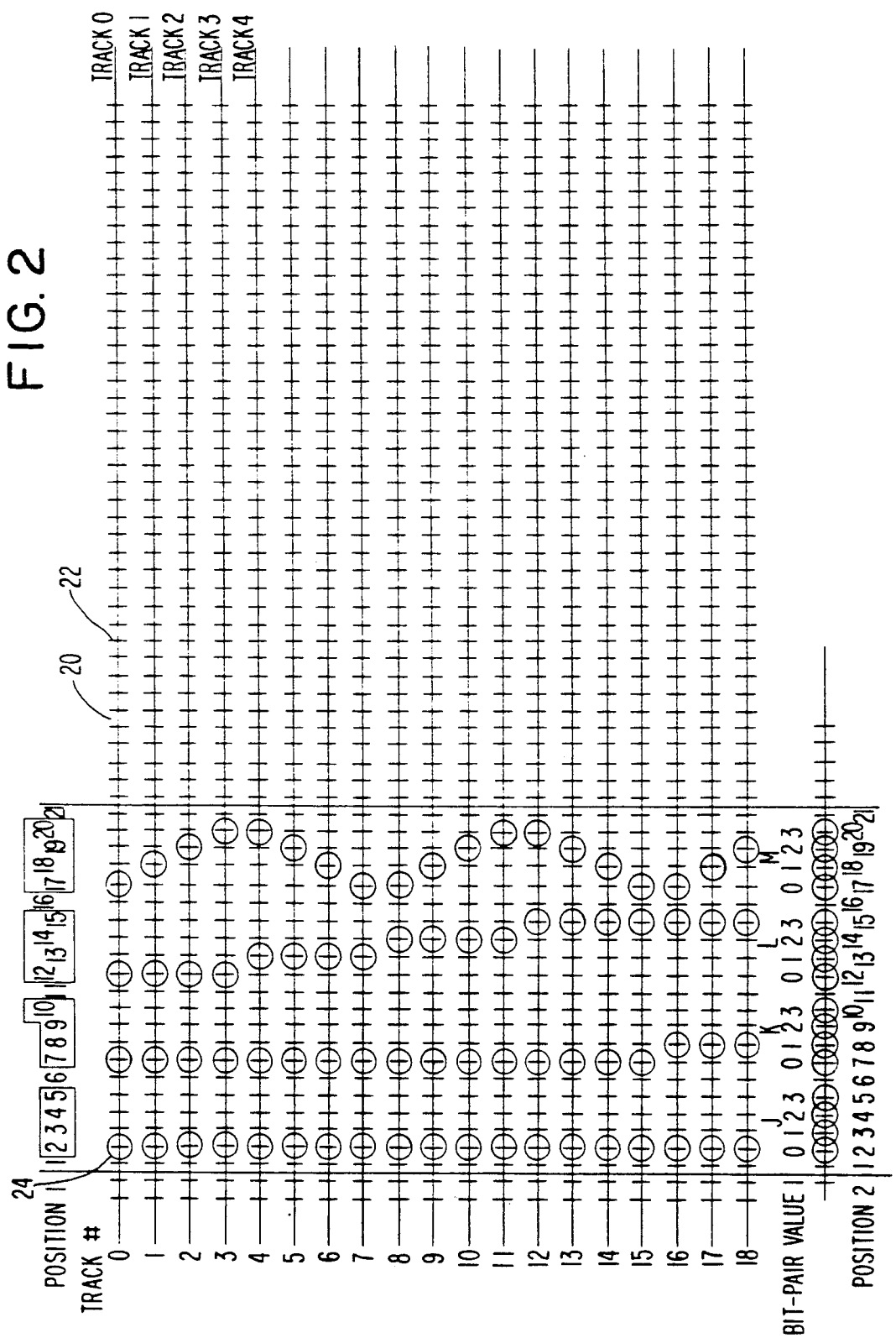
FIG. 2 illustrates schematically the manner by which code words of the present invention are represented by recording marks on a record carrier.

FIG. 2 is a schematic representation of the recording marks of the first 19 track addresses from the TABLE.

Each track is represented by a horizontal line, such as that indicated as 20. Each servo area on each track contains a succession of positions, symbolized in FIG. 2 as short vertical lines, such as that indicated as 22. Recording marks or pits burned into the surface of the optical disk are symbolized in FIG. 2 as small circles such as that indicated as 24.

In the preferred embodiment of the present invention, a code word occupies 21 positions on each track which are labeled in FIG. 2 as positions 1-21. Each of the four digits (J, K, L and M) occupies four positions as follows: digit J occupies positions 2-5; digit K occupies positions 7-10; digit L occupies positions 12-15; and digit M, the least significant digit, occupies positions 17-20. Positions 6, 11 and 16 between adjacent digits and positions 1 and 21 at each end of the track address are left as blank spaces in order to improve readability by providing greater separation between recording marks.

To improve address read accuracy, and to quickly correct address read errors that may occur, each track may have many servo areas and each address may be repeated several times on each track. The full address may be split into its two code words which can be recorded in different servo areas. Because the most significant code word only changes every 256 tracks while the least significant code word changes every track, the least significant code word may be recorded more frequently than the most significant and the accuracy of an address read operation can be efficiently verified. Another means to improve accuracy is to split each code word into two four-bit parts or four two-bit parts and record the parts in different servo areas. When read, the parts can be multiplexed and the entire code word recovered.

As can be seen in FIG. 2, all of the code words contain the same, fixed number of recording marks. Each digit (J-M) is represented using only one recording mark in one of the four possible positions. Consequently, by noting the position of each of the four recording marks in a code word, the read assembly is able to recover the code word itself from the disk surface. Such a coding method can be characterized as a creeping one out of four code because, as discussed with respect to the code words in the TABLE, successive code words differ by one digit changing by one.

FIG. 2 illustrates how this change is transformed into the physical change in pit positions between code words. Continuing the previous example, the code words for tracks 15 and 16 are 0030 and 0130, respectively, with digit K changing by one from 0 to 1. In FIG. 2, track 15 has a recording mark in each of positions 2, 7, 15 and 17; track 16 has recording marks in each of positions 2, 8, 15 and 17. Only the recording mark representing digit K changes; its position changes by one from position 7 to position 8. Although not illustrated in FIG. 2, such a progression continues past track 18 for tracks 19 through 255 as shown in the TABLE.

Figure 3:
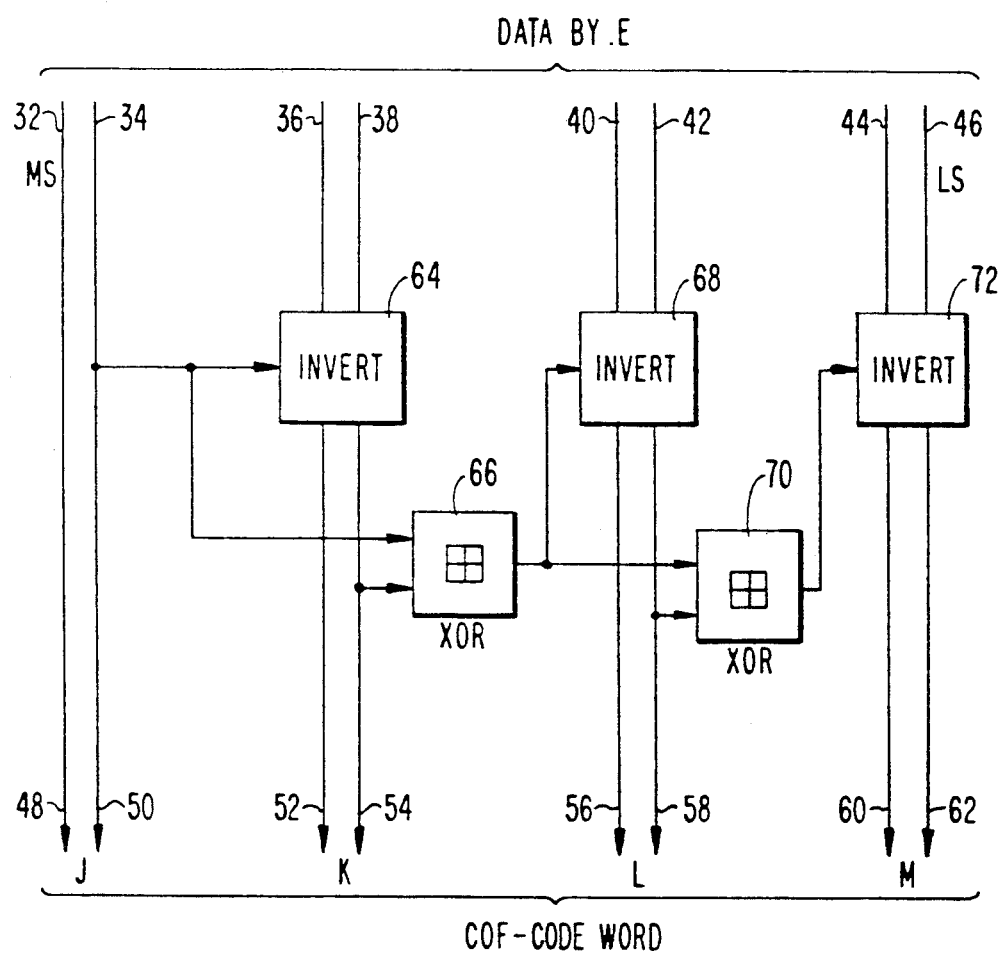
FIG. 3 illustrates a block diagram of an encoding circuit of the present invention.

FIG. 3 illustrates a block diagram of an encoder circuit that can be used to generate the creeping one out of four code words of the present invention. Encoder 30 has eight data inputs 32, 34, 36, 38, 40, 42, 44 and 46 to receive binary coded track addresses from a control circuit (not shown). Encoder 30 also has eight data outputs 48, 50, 52, 54, 56, 58, 60 and 62 where digits J-M are generated, each in two-bit binary form.

Data output 48 is coupled to data input 32; data output 50 is coupled to data input 34. Data input 34 is also coupled to a control input of first inverter 64 and to one input of a first exclusive OR gate 66. Data inputs 36 and 38 are coupled to inputs of first inverter 64 and data outputs 52 and 54 are coupled to outputs of first inverter 64. Data output 54 is also coupled to an input of first exclusive OR gate 66. The output of first exclusive OR gate 66 is coupled to a control input of a second inverter 68. Data inputs 40 and 42 are coupled to inputs of second inverter 68. Data outputs 56 and 58 are coupled to outputs of second inverter 68. The output of first exclusive OR gate 66 and data output 58 are coupled to inputs of a second exclusive OR gate 70. The output of second exclusive OR gate 70 is coupled to a control input of a third inverter 72. Data inputs 44 and 46 are coupled to inputs to third inverter 72 and data outputs 60 and 62 are coupled to outputs of third inverter 72.

In operation, an eight-bit track address byte is inputted into encoder 30 through data inputs 32-46, the most significant bit being input into data input 32 and the least significant bit being input into data input 46. The two most significant bits, at data inputs 32 and 34, are output unchanged at data outputs 48-50 and represent the most significant digit J. If the value at data input 34 is a logic one, inverter 64 is enabled and the values at data inputs 36 and 38 are inverted to produce data outputs 52 and 54 comprising digit K. If the value at data input 34 is a logic zero, first inverter 64 is disabled and data inputs 36 and 38 pass unchanged to data outputs 52 and 54.

Data input 34 and data output 54 are inputted into first exclusive OR gate 66 and an output is generated therefrom. If the output of first exclusive OR gate 66 is a logic one, second inverter 68 is enabled and the values at data inputs 40 and 42 are inverted to generate data outputs 56 and 58, comprising code word digit L. If the output of first exclusive OR gate 66 is logic zero, inputs 40 and 42 pass unchanged to data outputs 56 and 58.

The output of first exclusive OR gate 66 and data output 58 are inputted into second exclusive OR gate 70 and the data output is used to control inverter 72. If the output of second exclusive OR gate 70 is a logic one, inputs 44 and 46 are inverted to generate data outputs 60 and 62, comprising least significate digit M. If the output of second exclusive OR gate 70 is a logic zero, third inverter 72 is disabled and inputs 40 and 46 pass unchanged to data outputs 60 and 62.

In this fashion, each address byte, 0-255, is converted into a creeping one out of four code word of four two-bit digits, J-M. As previously noted, each of the four digits is translated into one of four positions for defining where a recording mark is to be provided on a predesignated area of the disk surface.

Figure 4:
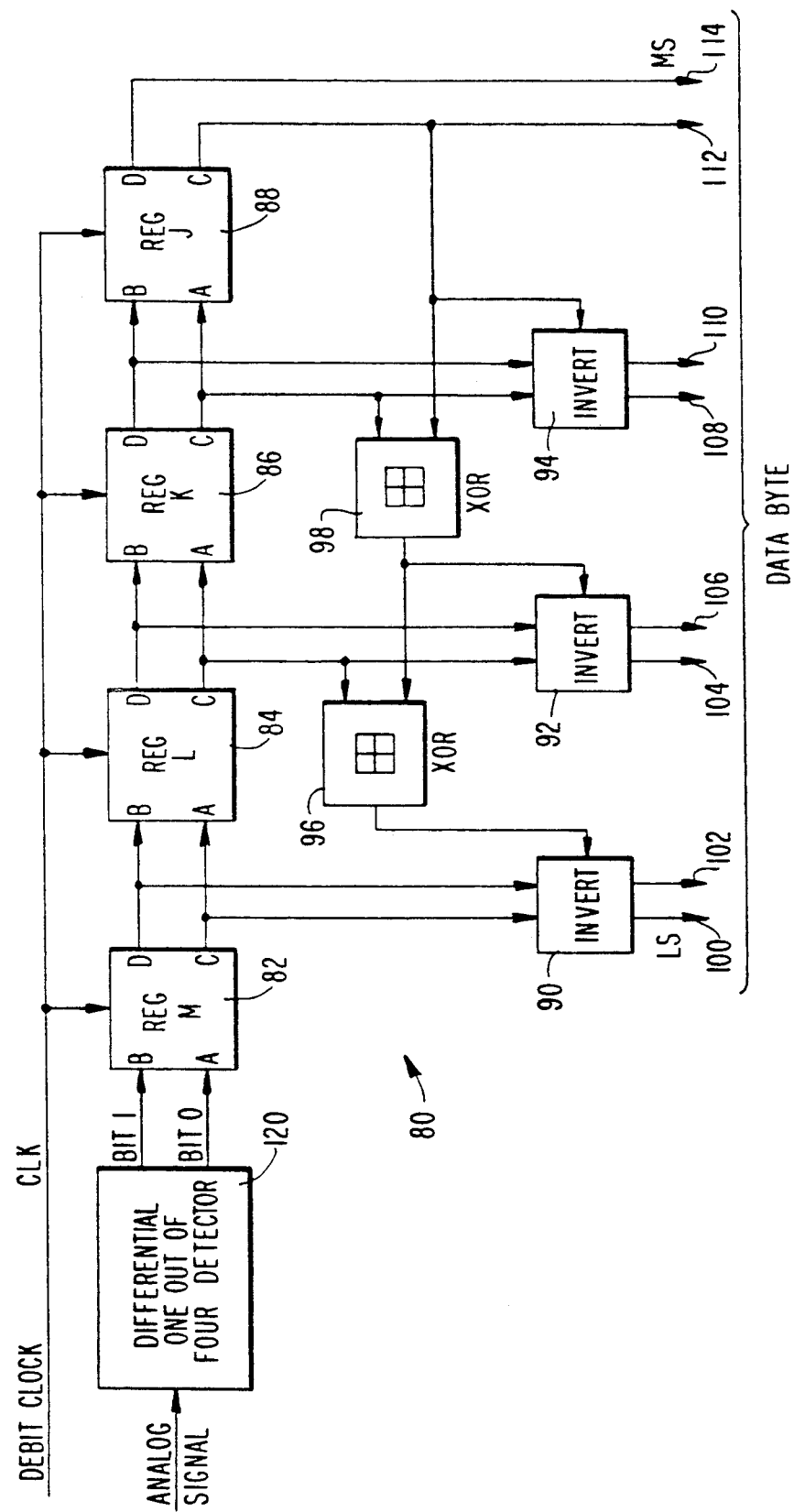
FIG. 4 illustrates a block diagram of a decoding circuit of the present invention.

FIG. 4 illustrates a block diagram of a creeping one out of four decoder 80 that can be used when a track address is read during a track seek operation. Decoder 80 comprises four two-bit registers 82, 84, 86 and 88, three inverters 90, 92 and 94, and two exclusive OR gates, 96 and 98, together with the differential detector 120.

Each register 82, 84, 86 and 88 has two inputs, A and B, and two data outputs, C and D. Data outputs C and D of M register 82 are coupled to inputs A and B of L register 84, respectively; data outputs C and D of L register 84 are coupled inputs A and B of K register 86, respectively; and data outputs C and D of register 86 are coupled to inputs A and B of J register 88, respectively. Data outputs C and D of M register 82 are coupled to inputs of first inverter 90; data outputs C and D of L register 84 are coupled to inputs of second inverter 92; data outputs C and D of K register 86 are coupled to inputs of third inverter 94. Data output C of K register 86 and output C of J register 88 are coupled to inputs of exclusive OR gate 98; data output C of L register 84 and the output of second exclusive OR gate 98 are coupled to inputs of first exclusive OR gate 96. The output of first exclusive OR gate 96 is coupled to a control input of first inverter 90; the output of second exclusive OR gate 98 is coupled to a control input of second inverter 92; data output C of J register 88 is coupled to a control input of inverter 94. The outputs of inverter 90 represent decoder outputs 100 and 102; the outputs of inverter 92 represent decoder outputs 104 and 106; the outputs of inverter 94 represent decoder outputs 108 and 110; and data outputs C and D of register 88 represent decoder outputs 112 and 114. Decoder output 114 represents the most significant bit of the track address byte and decoder output 100 represents the least significant bit.

Clock inputs of registers 82, 84, 86 and 88 are coupled to a clock signal CLK.

In operation, light reflected from a track address area on the disk surface is converted by the read assembly (not shown) into an analog signal AS which is inputted into the differential detector 120. The two outputs of differential detector 120 are coupled to inputs A and B of M register 82. With each pulse of clock signal CLK, the output of differential detector 120 (representing one analog value) is transmitted to M register 82. Simultaneously, the previous contents of M register 82 are transmitted to L register 84; the contents of L register 84 are transmitted to K register 86; and the contents of K register 86 are transmitted to J register 88. Thus, four pulses of clock signal CLK are necessary to load registers 88, 86, 84 and 82 with code word digits J-M, respectively.

The outputs of J register 88 are sent directly as decoder outputs 112 and 114 and the outputs of K register 86 are input into third inverter 94. If data output C of J register 88 is a logic one, then the outputs of K register 86 are inverted to become decoder outputs 108 and 110. If data output C of J register 88 is a logic zero, third inverter 94 is disabled and the outputs of K register 86 are passed unchanged to decoder outputs 108 and 110. Data output C of J register 88 and data output C of K register 86 are inputted into second exclusive OR gate 98, the output of which is used to control second inverter 92. The data outputs of L register 84 are inputted into second inverter 92 and, if the output of second exclusive OR gate 98 is a logic one, the data outputs of L register 84 are inverted to become decoder outputs 104 and 106. If the output of second exclusive OR gate 98 is a logic zero, second inverter 92 is disabled and the outputs of L register 84 pass unchanged to decoder outputs 104 and 106. The output of second exclusive OR gate 98 and data output C of L register 84 are inputted into first exclusive OR gate 96, the output of which controls first inverter 90. If the output of first exclusive OR gate 96 is a logic one, the data outputs of M register 82, which are input to first inverter 90, are inverted to become decoder outputs 100 and 102. If the output of first exclusive OR gate 96 is a logic zero, the data outputs of M register 82 pass unchanged to decoder outputs 100 and 102.

In this fashion, the recording marks representing two address bytes can be scanned, read as an analog value, converted into a digital signal and decoded to produce a usable track address.

Figure 5:
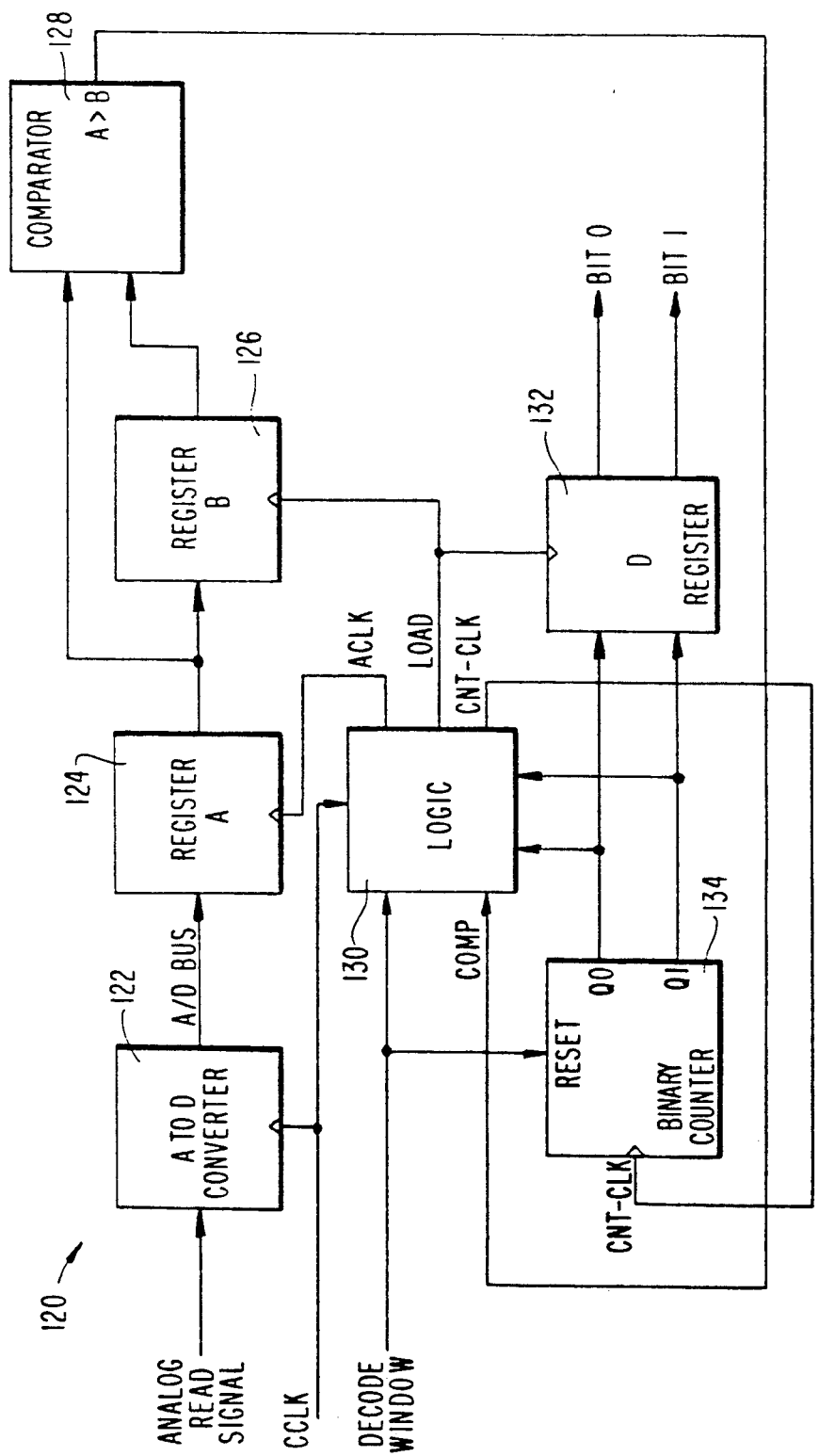
FIG. 5 illustrates a block diagram of a differential detector circuit of the present invention.

FIG. 5 represents a block diagram of differential detector 120. The output of an analog-to-digital converter 122 is coupled to the input of a A register 124. The output of A register 124 is coupled to the input of B register 126 and to an input of a comparator 128. The output of B register 126 is coupled to a second input of comparator 128. The output of comparator 128 is coupled to an input of a logic circuit 130; a decode window signal DW is input into another input of logic circuit 130. One output of logic circuit 130 represents signal LOAD and is coupled to clock inputs of B register 126 and D register 132. A channel clock signal CCLK is coupled to clock inputs of convertor 122 and logic circuit 130. Signal DW is inputted into the complimentary reset input of a two-bit binary counter 134. The two outputs of counter 134 are coupled to inputs of D register 132 and to inputs of logic circuit 130. The two outputs of D register 132 represent the detector output and are coupled to inputs A and B of M register 82 (FIG. 4). Two additional clock signals are output from logic circuit 130: ACLK which is input to the clock input of A register 124 and CNT-CLK which is input to the clock input of counter 134.

FIG. 6 is a timing diagram illustrating signal waveforms associated with the operation of differential detector 120 as time progresses from left to right on the diagram. Signal REG A represents a series of sample analog values, digitized and input to A register 124. Signal CCLK is the output from a continually running channel clock which is coupled to converter 122 and logic circuit 130. Signal ACLK is coupled to the clock input of A register 124; its pulses, and those of signal CNT-CLK, are slightly delayed from signal CCLK. Signal DW (decode window) enables logic circuit 130 when it is at a high logic level and resets counter 134 when it is at a low logic level. It is synchronized with clock bits recorded on the optical disk and permits detector 120 to compare values reflected from the four positions of each position segment. In FIG. 6, signal DW is at a high logic level during one period of four clock pulses, indicating that detector 120 is reading one position segment from the disk surface.

Signal LOAD represents one output from logic circuit 130 and makes a transition to a high logic level following the first rising edge of signal CCLK after signals DW and COMP are at a high logic level. Signal LOAD makes a transition to a low logic level after the falling edge of the same clock pulse of signal CCLK.

Signal REG B represents the contents of B register 126 during the read cycle. It receives the contents of A register 124 after signal LOAD makes a transition from a low to a high logic level. Signal COMP is the output of comparator 128 and is at a high logic level when the value in A register 124 is greater than the value in B register 126. Signal CNT-CLK represents an output from logic circuit 130 and is used to clock binary counter 134. Both signal CNT-CLK and signal ACLK have the same frequency as signal CCLK but are delayed slightly from signal CCLK to insure proper sequencing of logic operations.

Signals $Q_0$ and $Q_1$ represent the outputs of binary counter 134, with signal $Q_0$ being the least significant bit. Binary counter 134 is reset to 0 0 when signal DW is at a low logic level and begins counting after the rising edge of the first clock pulse of signal CNT-CLK following the transition of signal DW to a high logic level. Signals $Q_0$ and $Q_1$ represent the position being read in a position segment. Signals BIT 0 and BIT 1 are the outputs of D register 132 and, after one read cycle of four clock pulses, represent the position at which a pit is located in a position segment. Because, like B register 126, D register 132 is clocked with signal LOAD, it receives the contents of binary counter 134 after the rising edge of signal LOAD making a transition to a high logic level.

The operation of differential detector 120 is as follows: when the write/read assembly of the optical disk system is to read a track address byte from a set of four position segments, the laser beam will be directed to reflect off of position zero of position segment zero. B register 126 and D register 132 contain "don't care" values, generally their final values from the previous read cycle. At the falling edge of clock pulse zero, signal DW transitions to a high logic level 140 to begin the first detection operation. The value of an analog read signal which is inputted into converter 122 is converted into a digital signal having a particular value 142 and is transferred into A register 124. Because the magnitude of the reflection off of the first position (position zero) in the position segment is the only, and therefore the greatest, value received to that point in the read cycle, it is desirable that the value (142) be transferred to B register 126 and that the position (zero) be transferred to D register 132. Therefore, at the beginning of the next clock pulse (clock pulse one), the 0 0 of signals $Q_0$ and $Q_1$ cause logic circuit 130 to generate a high signal LOAD 144 which, in turn, triggers the transfer of the contents of A register 124 (value 142) into B register 126 (at 146) and the transfer of the contents of counter 134 (0 0) into D register 132 (at 148 and 150). Simultaneous with the high signal LOAD, logic circuit 130 also generates a high signal ACLK, which causes A register 124 to receive the value of the reflection off of position two, and a high signal CNT-CLK, which causes counter 134 to advance. The slight delay between a clock pulse of signal CCLK and a pulse on signals ACLK and CNT-CLK allows B register 126 and D register 132 to receive the contents of A register 124 and counter 134, respectively, before the latter two are updated with new values (value 152 in A register 124 and 0 1 in counter 134).

The contents of A register 124 and B register 126 are also transferred to comparator 128 after the beginning of clock pulse one. After a short delay, comparator 128 determines that the contents of A register 124 (value 152) are greater than the contents of B register 126 (value 146) and outputs a logic 1 154. Halfway through clock pulse one, signal LOAD transitions back to a low logic level. Because both signals DW and COMP are high, signal LOAD makes the transition to a high logic level 156 at the rising edge of clock pulse two. Consequently, D register 132 receives the two outputs from counter 134 and signals BIT 1 and BIT 0 show 0 1, respectively, 158 and 160 and B register 126 receives the value of A register 124 (at 162). After a short delay, the digitized amplitude of the reflection from position two 164 enters A register 124 and binary counter 134 advances with signals $Q_1$ and $Q_0$ showing 1 0 respectively (at 166 and 168).

During the next clock cycle (clock pulse 3), the new contents of A register 124 (representing the magnitude 164 of the reflected signal from position two) are compared with the contents of B register 126 (containing the magnitude 162 of the reflected signal of position one). In this case, the value 164 in A register 124 is less than the value 162 in B register 126. Consequently, comparator 128 outputs a low logic signal and signal LOAD remains at a low logic level 170. D register 132 is disabled from receiving the 1 0 from $Q_1$ and $Q_2$, and retains a 0 1 indicating that position 1 was the position of the highest reflected signal received to that point in time. The contents of B register 126 also remain unchanged so that B register 126 retains the value 162 of the reflected signal with the greatest amplitude so far received.

In a similar manner, reflected signal three 172 is compared with the stored value of the highest signal (in B register 126) and found again to be of lower magnitude. Consequently, signal COMP remains in a low logic state as does signal LOAD while D register 132 retains its value even though counter 134 has advanced.

After the falling edge of clock pulse 4, signal DW goes low 174 for one clock pulse, indicating that all four positions of one segment have been read, and signal CLK in FIG. 4 causes M register 82 to receive the contents of D register 132, 0 1. Signal DW will go high again at the beginning of the next clock pulse, cutting off signal CLK to decoder 80 and commencing the detection of the location of the pit in the second position segment.

The sequence is repeated until the remaining position segments have been detected, enabling all four registers 82, 84, 86 and 88 in FIG. 4 to receive the four pit positions of one track address byte. Decoder 80 is then activated and the track address byte is generated at the eight decoder outputs.

With regard to the encoding and decoding of code words or track address information, in another embodiment, a look-up table is provided that correlates decoded and encoded track address bytes. Instead of generating encoded track address information each time an optical disk is formatted with the track address information, such encoded track address information is already generated and stored in a memory look-up table. Accordingly, when determining the encoded track address information, the look-up table is accessed and the encoded track address information is obtained corresponding to the decimal digit, actual or decoded track address byte. Such a look-up table can be prepared and stored in memory using, in the embodiment in which the optical disk has 256 tracks, the TABLE disclosed herein. By way of example, if track address byte 100 is to be encoded, access is made to a look-up table that has information correlating track address byte 100 with encoded track address information. As understood from the TABLE, the correlated encoded track address information for J, K, L and M is 1, 1, 1, 3; respectively. These digits can be converted to binary form for storing the same on the optical disk in the pre-designated area.

Conversely, the decoded track address information can be determined using such a look-up table, instead of the decoder circuitry of FIG. 4, except for the differential detector 120. That is, the binary outputs from the differential detector 120 can be used to access a look-up table that correlates such track address information with decoded track address information. For example, in the case of track address byte 200, the four successive two binary bit outputs from the differential detector 120 are used to determine that the corresponding digits for J, K, L and M are 3, 3, 2, 0, respectively. This information can be used to correlate with the track address 200 identified in the disclosed TABLE.

In conjunction with such decoding and encoding, any such look-up table information or implemented hardware is devised, for the embodiment disclosed, using an algorithm, such as the following:

DataByte: = J*64;
If J = odd then DataByte: = DataByte − (3 − K)*16 else DataByte: = DataByte − K*16;
If (J − K) = odd then DataByte: = DataByte − (3 − L)*4 else DataByte: = DataByte − L*4;
If (J + K + L) = odd then DataByte: = DataByte − (3 − M)*1 else DataByte: = DataByte + M*1

To assist in understanding the foregoing decoding algorithm, an example of its use is provided utilizing the information in the disclosed TABLE. For encoded track address byte 100, the encoded track address information has J = 1, K = 1, L = 1 and M = 3. Using this information:

DataByte = 1*64 = 64
Since J = 1 is odd, DataByte = 64 − (3 − 1)*16 = 64 + 32 = 96
Since J + K = 1 + 1 = 2 is even, then DataByte = 96 − 1*4 = 96 + 4 = 100
Since J + K + L = (1 + 1 + 1) = 3 is odd then DataByte = 100 − (3 − 3)*1 = 100 − 0 = 100.

Thus, using the aforesaid algorithm, the encoded track address byte has been decoded into the track address byte 100.

With respect to encoding, in accordance with the disclosed embodiment, the following algorithm can be used:

J: = Int(DataByte/64);
RestJ: = DataByte Mod 64;
If J = odd then K: = 3 − Int(RestJ/16) else K: = Int(RestJ/16);
RestK: = RestJ Mod 16;
If (J − K) = odd then L: = 3 − Int(RestK/4); else L: = Int(RestK/4);
RestL: = RestK Mod 4;
If (J − K − L) = odd then M: = 3 − RestL else M: = RestL To assist in understanding the foregoing encoding algorithm, an example of its implementation is next described using track address byte 100 as the address to be encoded.

J = Int(100/64) = 1, where Int indicates that the value to be determined is an integer that is not greater than the result of the division.
RestJ = 100100 = 36
Since J = 1, which is odd, then K = 3 − Int(36/16) = 3 − 2 = 1
RestK = 0100 = 4
Since (J + K) = 2, which is even, then L = Int(4/4) = 1
RestL = 00 = 0
Since (1 + 1 + 1) = 3, which is odd, then M = 3 − 0 = 3
Hence, the encoded track address byte 100 is represented by: J = 1, K = 1, L = 1, M = 3.

The foregoing description of the invention has been presented for purposes of illustration and description. Further, the description is not intended to limit the invention in the form disclosed therein. Consequently, variations and modifications commensurate with the above teachings, and the skill or knowledge in the relevant art, are within the scope of the present invention. The embodiments described hereinabove are further intended to explain best modes known of practicing the invention and to enable others skilled in the art to utilize the invention in such, or other embodiments and with the various modifications required by their particular applications or uses of the inventions. It is intended that the appended claims be construed to include alternative embodiments to the extent permitted by the prior art.

What is claimed is:

1. An apparatus for encoding and decoding track address information, comprising:
   first means for encoding inputted track address information and outputting encoded track address information, said encoded track address information included recording marks;
   second means for storing said encoded track address information, said second means having a plurality of tracks including first and second tracks that are adjacent to each other, each of said tracks being defined as having a plurality of position segments with said plurality of position segments storing track address information, each of said position segments having a number of pit positions, each of said position segments having a single recording mark stored in a selected one of said pit positions, wherein said pit position having said recording mark in a first of said position segments in said first track is different from said pit position having said recording mark in the corresponding first position segment in said second track; and
   third means, responsive to encoded track address information received from said second means, for decoding said encoded track address information, said third means including differential detection means in which, for each of said position segments, encoded track address information stored in each of said pit positions is compared with said encoded track address information stored in other of said pit positions for determining said pit position having said recording mark.

2. An apparatus, as claimed in claim 1, wherein:
   said pit positions having said recording marks in said plurality of position segments, other than said first position segment, in said first track address are the same as said pit positions having said recording marks in said plurality of position segments in said second track address, except for said first position segment.

3. An apparatus, as claimed in claim 1, wherein:
   said pit position having said recording mark in said first position segment in said second track address is one of a r + 1 and r − 1 pit position, where said pit position having said recording mark in said first position segment in said first track address is r.

4. An apparatus, as claimed in claim 1, wherein:
   said encoded track address information stored in each of said position segments represents one digit.

5. An apparatus, as claimed in claim 1, wherein:
   said first means outputs a binary representation of said pit position of said first position segment for said first track address that is to include a recording mark.

6. An apparatus, as claimed in claim 1, wherein said first means includes:
   look-up table means for correlating information relating to encoded and decoded track address information.

7. An apparatus, as claimed in claim 1, wherein said first means includes:
   a plurality of inverting means for receiving track address information; and
   a plurality of logic means responsive to at least one of said track address information and said inverting means, wherein said first means outputs a plurality of binary numbers indicative of pit positions that are to receive a recording mark.

8. An apparatus, as claimed in claim 7, wherein: said logic means includes at least a first exclusive OR gate communicating with at least one of said plurality of inverting means.

9. An apparatus, as claimed in claim 1, wherein said third means includes:
a plurality of register means for receiving encoded track address information from said differential detection means;
clock means communicating with said plurality of register means for controlling transfer of encoded track address information relative to said plurality of register means; and
converting logic means communicating with said plurality of register means for receiving encoded track address information and converting it to decoded track address information.

10. An apparatus, as claimed in claim 9, wherein said converting logic means includes:
a plurality of inverting means responsive to said plurality of register means; and
a plurality of exclusive OR gate means responsive to at least one of said plurality of inverting means and said plurality of register means, wherein said plurality of inverter means outputs binary numbers representative of track address information.

11. An apparatus, as claimed in claim 1, wherein said differential detection means includes:
comparator means for comparing track address information obtained from pit positions in said first position segment.

12. An apparatus, as claimed in claim 1, wherein said differential detection means includes:
analog-to-digital converter means for receiving an analog signal representative of encoded track address information; and
at least first and second register means for receiving encoded track address information, each of said first and second register means receiving track address information obtained from one of said pit positions of said first position segment.

13. An apparatus, as claimed in claim 1, wherein said differential detection means includes:
counter means for counting the number of said pit positions of said first position segment received by said differential detection means.

14. An apparatus, as claimed in claim 1, wherein said differential detection means includes:
logic circuitry means for determining whether a magnitude associated with track address information stored in one of said pit positions of said first position segment is different from a magnitude relating to track address information stored in at least one other of said pit positions of said first position segment.

15. A method for encoding and decoding track address information, comprising:
generating an encoded first track address;
recording said encoded first track address on a first track of a disk, said first track having a plurality of position segments for storing track address information, each of said position segments being defined by a number of pit positions, said recording step including writing a recording mark in one pit position of a first of said position segments, a single recording mark being recorded in each of said position segments at a selected one of said pit positions;
generating an encoded second track address;
recording said encoded second track address on a second track of said disk, said second track being adjacent to said first track and having a plurality of position segments for storing track address information, each of said position segments being defined by a number of pit positions, said recording step including writing a recording mark in a pit position of a first of said position segments, said pit position being different from said one pit position of said first position segment of said first track, a single recording mark being stored in each of said position segments at a selected one of said pit positions; and
comparing a magnitude relating to track address information stored in a pit position in said first position segment of said first track address with at least one other magnitude relating to track address information stored in another of said pit positions thereof.

16. A method, as claimed in claim 15, wherein:
the contents of each of said plurality of position segments represents a digit of said encoded track address information.

17. A method, as claimed in claim 15, wherein:
said pit position storing said recording mark in said first position segment of said second track address is one of a $r+1$ and $r-1$ pit position, where said pit position storing said recording mark of said first position segment of said first track address is r.

18. A method, as claimed in claim 15, wherein:
said step of generating an encoded first track address includes outputting a binary representation of said pit position of said first position segment for said first track address that is to receive said recording mark.

19. An apparatus for encoding and decoding track address information, comprising:
first means for encoding an address "n," of a first track into encoded track address information having "d" digits;
an optical disk including said first track and at least one adjacent track with the successive address of "$n+1$," each of said first and second tracks having a plurality of position segments, including a first position segment, the number of said position segments corresponding to each of said digits of said encoded track address information, each of said position segments occupying "p" positions on said first and second tracks, said encoded track address information being stored on said first track in a first pattern that has a single recording mark in each of said position segments, said recording mark occupying a selected one of said "p" positions, wherein said occupied position being indicative of the value of said corresponding digit and wherein said recording mark in said first track address "n" occupies position "r" in said first position segment and said recording mark in said track address "$n+1$" occupies a selected one of position "$r-1$" and "$r+1$" in said corresponding first position segment; and
second means, responsive to encoded track address information received from said optical disk, for decoding said encoded track address information, said second means including differential detection means.

20. An apparatus, as claimed in claim 19, wherein:
"d" is 4;
"p" is 4; and
said first track address is identified by a first eight-bit binary number.

21. An apparatus, as claimed in claim 19, wherein said first means includes:
means for converting said first binary number into said first track address information having four two-bit binary segments, each of said segments being represented by a decimal digit, wherein the decimal digits representing said first track address "n" differ from said decimal digits representing said successive track address "n+1" by one such digit changing a value by one.

22. An apparatus, as claimed in claim 19, wherein:
said second means includes look-up table means for correlating magnitudes relating to encoded and decoded track address information.

23. An optical disk for storing track address information indicative of a track address with the track address information adapted to be decoded using differential detection, comprising:
a first track having an address n;
a second track adjacent to said first track having an address n−1;
p position segments, including a first position segment, define on each of said first and second tracks;
s positions defined in each of said position segments;
a pattern of m recording marks provided on each of said first and second tracks, wherein each of said position segments has a single recording mark in a selected one of said s positions, said first position segment of said first track having a first recording mark in position r and said first position segment of said second track having a first recording mark in a selected one of positions r+1 and r−1.

24. An optical disk, as claimed in claim 23, wherein:
p is 4;
s is 4; and
said first track address includes a first eight-bit binary number.

* * * * *